Patented July 27, 1926.

1,594,201

UNITED STATES PATENT OFFICE.

CHARLES HORAN, OF NEW YORK, N. Y.

COMPOSITION OF MATTER.

No Drawing. Application filed February 12, 1923. Serial No. 618,704.

This invention relates to a composition of matter which has a high electrical resistance, is non-inflammable, giving off neither flame nor smoke when heated, and is waterproof. The new composition of matter may be used as an insulating composition for use in all types of electrical apparatus, and in making various articles.

The new composition of matter which I have invented comprises collodion and a chemical substance combined therewith to render the composition non-inflammable.

A specific composition embodying the invention is made of the following components in the proportions stated:

|  | Per cent. |
|---|---|
| Collodion | 88 |
| Ammonium phosphate | 10 |
| Gum camphor | 2 | the collodion being a 5% solution of pyroxylin in an ether-alcohol solvent.

I have found that the proportions of the ingredients mentioned may be varied at least to the following extent:

The collodion from 85% to 89%.

The ammonium phosphate from 8% to 15%.

The gum camphor from 1% to 7%.

The collodion renders the composition cohesive, while the ammonium phosphate renders the composition non-inflammable. The gum camphor gives a flexibility to the composition, and the proportion of gum camphor to be used, therefore, depends upon the degree of flexibility required for the particular use to which the composition is to be put. If desired, a small proportion of alum, amounting to not more than about 1% may be used in combination with the ingredients mentioned to render the composition stiff. When 1% of alum is put in the composition, the proportion of camphor is preferably reduced to 1%.

In making the composition, ammonium phosphate crystals are first reduced to a powder. The gum camphor is then shaved and mixed with the powdered ammonium phosphate. The collodion is then added to the fine powder which results from this mixing, and is thoroughly mixed with the powder for from 15 to 18 minutes. This results in forming a thick liquid, which hardens after drying for from 24 to 48 hours at a temperature of about 70° F.

When the composition is to be used to form a panel or other piece of comparatively thick insulating material, the liquid formed by adding the collodion to the powder is placed in molds of the desired shape and thoroughly dried in the molds.

When the composition is to be used as an insulating cover for wire, the wire is dipped in the liquid or drawn through it. This results in causing the liquid to adhere to the wire. The liquid adhering to the wire is dried on the wire and forms a flexible, non-inflammable insulating coating. Wire so coated is a new article of manufacture, which is part of my invention.

An important feature of the invention consists in applying the composition to absorbent material, such as paper and textiles. This may be accomplished by dipping muslin or other fabric in the liquid and allowing it to dry on the fabric. In this way, a thin, flexible, non-inflammable sheet of high electrical resistance is formed. The sheets may be applied to walls behind electrical apparatus to prevent short circuits and fire or may be formed into gloves to protect the wearer from shocks in handling electrical apparatus.

When the new composition of matter is subjected to excessive heat, it gives off no flame or smoke. If the heat is sufficiently high, the composition melts and chars. The liquid formed by the melting of the composition is, however, viscous, so that even when the composition is melted by excessive heat it tends to remain in the position in which it has been placed and continues to act as an electrical insulator.

While I have described a specific method of making the new composition of matter which I have invented, and a number of the uses of the invention, I wish it clearly understood that my invention is by no means limited to any particular method of making the composition nor to its use for any particular purpose.

What I claim is:

1. A new composition of matter, consisting of from 85% to 89% collodion containing 5% pyroxylin, from 8% to 15% ammonium phosphate, and from 1% to 7% of gum camphor.

2. A new composition of matter, comprising a non-inflammable composition of high electrical resistance consisting of pyroxylin dissolved in ether-alcohol, an amount of ammonium phosphate materially greater than that of the pyroxylin and gum-camphor.

In testimony whereof I have hereunto set my hand.

CHARLES HORAN.